(12) United States Patent
Yanase et al.

(10) Patent No.: US 9,416,057 B2
(45) Date of Patent: *Aug. 16, 2016

(54) HONEYCOMB STRUCTURE

(71) Applicant: NGK INSULATORS, LTD., Nagoya (JP)

(72) Inventors: Hidetoshi Yanase, Nagoya (JP); Tomokatsu Aoyama, Nagoya (JP); Yoshiaki Hatakeyama, Wako (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/029,846

(22) Filed: Sep. 18, 2013

(65) Prior Publication Data
US 2014/0087128 A1 Mar. 27, 2014

(30) Foreign Application Priority Data
Sep. 25, 2012 (JP) ................................. 2012-210840

(51) Int. Cl.
B01D 46/24 (2006.01)
C04B 38/00 (2006.01)
B28B 11/12 (2006.01)
B28B 19/00 (2006.01)

(52) U.S. Cl.
CPC ........ *C04B 38/0009* (2013.01); *B01D 46/2462* (2013.01); *B28B 11/12* (2013.01); *C04B 38/0093* (2013.01); B01D 46/2466 (2013.01); B28B 19/0038 (2013.01); Y10T 428/24149 (2015.01)

(58) Field of Classification Search
CPC .......... B01D 46/2462; C04B 38/0093; C04B 38/0096
See application file for complete search history.

(56) References Cited

U.S. PATENT DOCUMENTS

| | | | |
|---|---|---|---|
| 5,895,700 A | 4/1999 | Yamada et al. | |
| 2002/0068025 A1* | 6/2002 | Foster et al. | 422/180 |
| 2005/0129590 A1* | 6/2005 | Ichikawa | 428/116 |
| 2006/0165956 A1* | 7/2006 | Souda | 428/116 |
| 2008/0176029 A1* | 7/2008 | Ichikawa | 428/116 |
| 2014/0123612 A1* | 5/2014 | Yamada et al. | 55/523 |
| 2014/0363616 A1* | 12/2014 | Aoyama | 428/116 |

FOREIGN PATENT DOCUMENTS

| | | | |
|---|---|---|---|
| JP | 09-299811 A1 | | 11/1997 |
| JP | 2001314718 A | * | 11/2001 |
| JP | 2010-184218 A1 | | 8/2010 |

* cited by examiner

Primary Examiner — David Sample
Assistant Examiner — Nicholas W Jordan
(74) Attorney, Agent, or Firm — Burr & Brown, PLLC

(57) ABSTRACT

Disclosed is a honeycomb structure that hardly generates ring cracks; the honeycomb structure includes a honeycomb basal body having porous partition walls defining a plurality of cells that become through channels of a fluid; and a ring-shaped convex portion being a ring of convex portion surrounding an outer periphery of the honeycomb basal body over the whole periphery; and the ring-shaped convex portion is disposed to project outwardly from the outer periphery of the honeycomb basal body and to cover a part of the outer periphery of the honeycomb basal body, the shapes of both end portions of the ring-shaped convex portion are tapered shape, and a thickness of the ring-shaped convex portion in a cross section perpendicular to an extending direction of the cells is from 3 to 20 mm.

8 Claims, 5 Drawing Sheets

HONEYCOMB STRUCTURE

The present application is an application based on JP-2012-210840 filed on Sep. 25, 2012 with the Japanese Patent Office, the entire contents of which are incorporated herein by reference.

BACKGROUND OF THE INVENTION

1. Field of the Invention

The present invention relates to a honeycomb structure. More particularly, it relates to a honeycomb structure hardly generating ring cracks.

2. Background Art

Heretofore, an exhaust gas purifying device including a diesel particulate filter (DPF), a catalyst body and the like has been mounted in an exhaust system of an exhaust gas. The DPF is a filter for collecting a particulate matter (PM) mainly composed of soot. The catalyst body is the one for purifying harmful substances such as carbon monoxide (CO), hydrocarbons (HC) and nitrogen oxides ($NO_x$) included in the exhaust gas. Moreover, a honeycomb structure has been used as a catalyst loading body constituting this catalyst body, or the DPF.

As a possible cause for a failure of the exhaust gas purifying device, there is a generation of a ring-shaped crack in the honeycomb structure. Such a crack as generated in the honeycomb structure will be called "a ring crack". As shown in FIG. 9, this ring crack is a crack (a ring crack 50) formed at a honeycomb structure 200 so as to be substantially perpendicular to an extending direction of cells 2. Moreover, the ring crack 50 is formed so as to extend in an outer peripheral direction in an outer periphery of the honeycomb structure. FIG. 9 is a perspective view schematically showing a state that the ring crack is generated at the conventional honeycomb structure.

It is considered that a general factor for this ring crack is a tensile stress occurring in a total length direction (the extending direction of the cells) of the honeycomb structure. The tensile stress is a stress occurring by a difference between a thermal expansion coefficient of a ceramic constituting the honeycomb structure and a thermal expansion coefficient of a metal can body housing this honeycomb structure. This tensile stress occurs by placing the honeycomb structure in the environment where heating and cooling are repeated. This tensile stress tends to increase, as a ratio (A/B) between a length (a total length (A)) of the honeycomb structure in the extending direction of the cells and a diameter (an outer diameter (B)) of the honeycomb structure in a cross section perpendicular to the extending direction of the cells increases. Therefore, the ring crack is easily generated as the ratio A/B increases. Here, the total length (A) is "the length" of the honeycomb structure "in the extending direction of the cells". Moreover, the outer diameter (B) is the diameter "of the cross section" of the honeycomb structure "which is perpendicular to the extending direction of the cells".

Therefore, as a method of suppressing the generation of the ring crack, there is known a method of decreasing the ratio A/B by increasing the outer diameter. Moreover, a honeycomb structure making the ratio A/B in a predetermined range has been suggested (see, e.g., Patent Document 1).
[Patent Document 1] JP-A-H09-299811

SUMMARY OF THE INVENTION

However, a degree of production difficulty of a honeycomb structure increases as an outer diameter thereof increases. Furthermore, when it is used as a catalyst loading body, an amount of a noble metal to be loaded increases as the outer diameter thereof becomes larger. Moreover, as the outer diameter of the honeycomb structure increases, a whole exhaust gas purifying device can not help growing in size. When the honeycomb structure is mounted in a car, there has been a limit on increasing the outer diameter of the honeycomb structure since a space for mounting is a limited space such as physically very near to an engine or in a lower surface of a car body.

The present invention has been developed in view of the above mentioned problems. The present invention provides a honeycomb structure hardly generating ring cracks.

According to a first aspect of the present invention, a honeycomb structure includes: a honeycomb basal body having porous partition walls defining a plurality of cells to become through channels of a fluid; and a ring-shaped convex portion being a ring of convex portion surrounding an outer periphery of the honeycomb basal body over the whole periphery, wherein the ring-shaped convex portion is disposed to project outwardly from the outer periphery of the honeycomb basal body and to cover a part of the outer periphery of the honeycomb basal body, shapes of both end portions of the ring-shaped convex portion are tapered shape, and a thickness of the ring-shaped convex portion in a cross section perpendicular to an extending direction of the cells is from 3 to 20 mm.

According to a second aspect of the present invention, the honeycomb structure according to the first aspect is provided, wherein the thickness of the ring-shaped convex portion in the cross section perpendicular to the extending direction of the cells is from 5 to 10 mm.

According to a third aspect of the present invention, the honeycomb structure according to the first or second aspect s provided, wherein a width of the ring-shaped convex portion is from 1 to 80% of a length in the extending direction of the cells.

According to a fourth aspect of the present invention, the honeycomb structure according to any one of the first to third aspect is provided, wherein a part of a surface of the ring-shaped convex portion has a planar shape parallel to the extending direction of the cells.

According to the fifth aspect of the present invention, the honeycomb structure according to any one of the first to fourth aspect is provided, wherein the honeycomb basal body is made of at least one selected from the group consisting of cordierite, silicon carbide, mullite, aluminum titanate and alumina.

A honeycomb structure of the present invention includes the above "ring-shaped convex portion", and hence ring cracks are hardly generated. Moreover, the honeycomb structure of the present invention hardly generates a defect such as chip in the above "ring-shaped convex portion" even when the above "ring-shaped convex portion" thereof is subjected to an external force during conveyance or the like.

DETAILED DESCRIPTION OF THE INVENTION

Hereinafter, embodiments of the present invention will specifically be described with reference to the drawings. The present invention is not limited to the following embodiments. It should be understood that the following embodiments to which modifications, improvements and the like are suitably added on the basis of ordinary knowledge of a person skilled in the art without departing from the gist of the present invention also fall in the gist of the present invention.

Figure 1:
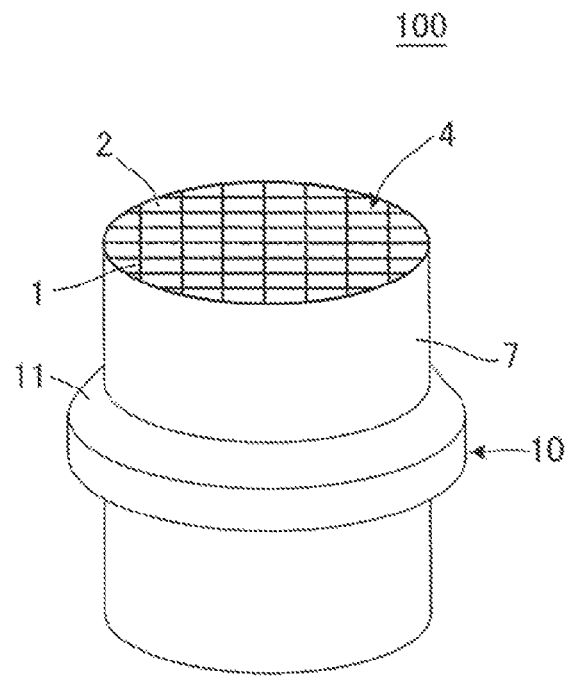
FIG. 1 is a perspective view schematically showing one embodiment of a honeycomb structure of the present invention.
Figure 2:
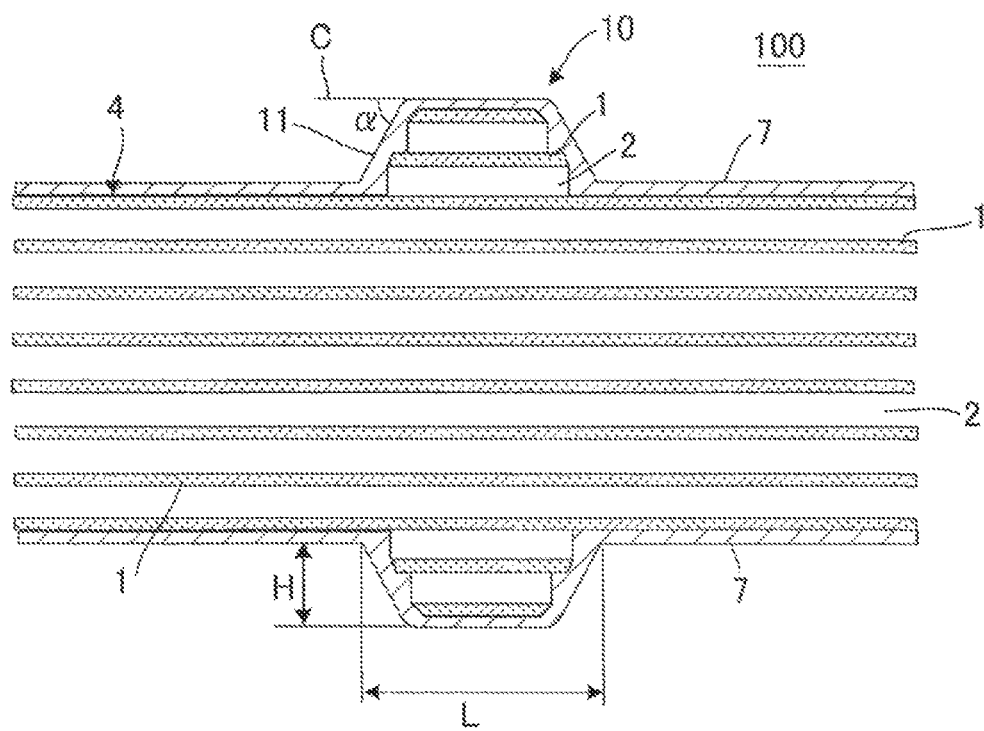
FIG. 2 is a schematic view showing a cross section, which is parallel to an extending direction of the cells, of the one embodiment of the honeycomb structure of the present invention.

(1) Honeycomb Structure:

One embodiment of a honeycomb structure of the present invention, as in a honeycomb structure 100 shown in FIG. 1 and FIG. 2, includes a honeycomb basal body 4 having porous partition walls 1 defining a plurality of cells 2 to become through channels of a fluid. Furthermore, the honeycomb structure 100 includes a ring-shaped convex portion 10 having a ring shape and surrounding an outer periphery of the honeycomb basal body 4 over the whole periphery. The ring-shaped convex portion 10 is disposed to project outwardly from the outer periphery of the honeycomb basal body 4 and to cover a part of the outer periphery of the honeycomb basal body 4. Furthermore, the ring-shaped convex portion 10 has a tapered shape at both end portions of the ring-shaped convex portion 10 in an extending direction of the cells 2. Additionally, in the honeycomb structure 100, a thickness of the ring-shaped convex portion 10 in a cross section perpendicular to the extending direction of the cells 2 (the thickness of the ring-shaped convex portion) is from 3 to 20 mm. Here, "the tapered shape" indicates a shape that an outer diameter of the ring shape gets thin toward ends. Moreover, it can be said that "the thickness of the ring-shaped convex portion" is "the thickness in a direction from the center toward the outer periphery (a radius direction) in the cross section, which is perpendicular to a central axis, of the honeycomb structure". Furthermore, "the thickness of the ring-shaped convex portion" is the thickness of the portions excluding tapered portions in the ring-shaped convex portion. Moreover, when an outer peripheral coating layer is disposed in an outer peripheral surface of the honeycomb basal body 4, "the thickness of the ring-shaped convex portion" is a thickness from the surface of the outer peripheral coating layer, as shown in FIG. 2. FIG. 1 is a perspective view schematically showing the one embodiment of the honeycomb structure of the present invention. FIG. 2 is a schematic view showing a cross section, which is parallel to an extending direction of the cells, of the one embodiment of the honeycomb structure of the present invention.

The ring-shaped convex portion 10 is disposed "to project outwardly from the outer periphery of the honeycomb basal body 4 and to cover a part of the outer periphery of the honeycomb basal body 4". That is, a partial outer diameter of the honeycomb structure 100 increases. Therefore, the honeycomb structure 100 increases in the durability as against a tensile stress. As a result, the honeycomb structure 100 hardly generates ring cracks even when the tensile stress occurs.

Furthermore, in the honeycomb structure 100, the ring-shaped convex portion 10 is "the ring shape surrounding the outer periphery of the honeycomb basal body 4 over the whole periphery". Therefore, the honeycomb structure 100 increases in the durability against the tensile stress. This is because the tensile stress is uniformly applied by surrounding "the outer periphery of the honeycomb basal body 4 over the whole periphery". Accordingly, the honeycomb structure 100 hardly generates ring cracks even when the tensile stress occurs.

A thickness H of the ring-shaped convex portion 10 in the cross section perpendicular to the extending direction of the cells 2 is from 3 to 20 mm, preferably from 3 to 15 mm, and especially preferably from 5 to 10 mm. When the thickness H of the ring-shaped convex portion 10 in the cross section perpendicular to the extending direction of the cells 2 is smaller than 3 mm, a ring crack being at a degree of affecting a collecting function of a DPF are generated since the ring-shaped convex portion is extremely thin. When it is in excess of 20 mm, it is impossible to mount the honeycomb structure in a limited space for mounting in a car or the like.

The ring-shaped convex portion 10 is tapered shapes at both the end portions in the extending direction of the cells 2. Therefore, the ring-shaped convex portion 10 hardly generates a defect such as chip even when the ring-shaped convex portion 10 is subjected to an external force during conveyance or the like.

There is not any restriction on taper angles of both the end portions of the ring-shaped convex portion 10 in the extending direction of the cells. The taper angle of the ring-shaped convex portion 10 is preferably from 10 to 80°, and especially preferably from 20 to 60°. When it is smaller than 10°, there is a failure that it is impossible to mount the honeycomb structure 100 in the limited space for mounting in the car or the like. When it is larger than 80°, the end portion (an outermost peripheral portion) of the ring-shaped convex portion may be chipped. "The taper angle of the ring-shaped convex portion 10" is an acute angle α in angles formed by a straight line C parallel to the central axis of the honeycomb structure 100 and a tapered face 11 of the ring-shaped convex portion in the cross section parallel to the extending direction of the cells 2 (see FIG. 2). "The tapered face 11" is an end face of the ring-shaped convex portion having tapered shape.

A width L of the ring-shaped convex portion 10 is preferably from 1 to 80%, and especially preferably from 5 to 20% of a length in the extending direction of the cells of the honeycomb structure 100. When the width L of the ring-shaped convex portion 10 is within the above ranges, it is possible to suitably mount the honeycomb structure in the limited space for mounting in the car or the like. Moreover, it is possible to reduce the honeycomb structure weight since the ring-shaped convex portion 10 is not excessively large. When the width of the ring-shaped convex portion 10 is smaller than 1%, the ring crack might not suitably be prevented. When it is in excess of 80%, the honeycomb structure might grow in size not to mount the honeycomb structure in the limited space for mounting in the car or the like. "The width of the ring-shaped convex portion" is a length of the ring-shaped convex portion in the extending direction of the cells of the honeycomb structure. In other words, "the width of the ring-shaped convex portion" is a distance between ends of both the tapered shapes.

There is not any restriction on a disposing position of the ring-shaped convex portion 10 as long as the ring-shaped convex portion is disposed to cover a part of the outer periphery of the honeycomb basal body 4. That is, it may be disposed in a central portion or in the end portion of the honeycomb basal body 4, as long as the generation of the ring crack can be prevented. The central portion of the honeycomb basal body is a central portion of the honeycomb basal body in the extending direction of the cells. In the case of easily generating cracks in the central portion of the honeycomb basal body 4, the ring-shaped convex portion 10 is preferably disposed in the central portion of the honeycomb basal body 4. "The ring-shaped convex portion 10 is disposed in the central portion of the honeycomb basal body 4" means that "at least a partial ring-shaped convex portion 10 is disposed so as to cover the center of the honeycomb basal body 4 in the extending direction of the cells (the center of the honeycomb basal body 4)". That is, when "the ring-shaped convex portion 10 is disposed in the central portion of the honeycomb basal body 4", the following two cases are included. In other words, there are included both cases where "the center of the ring-shaped convex portion 10 in the extending direction of the cells (the center of the ring-shaped convex portion 10)" overlaps with the center (covers the center) of the honeycomb basal body 4, and where a portion of the ring-shaped convex portion 10 except for the center thereof overlaps with the center (covers the center) of the honeycomb basal body 4. It is to be noted that the honeycomb structure tends to easily generate cracks (the ring cracks) in the center of the honeycomb basal body 4 as a ratio (A/B) between a total length (A) and an outer diameter (B) increases.

The honeycomb structure tends to easily generate cracks (end face cracks) in the end face of the honeycomb basal body 4 as the ratio (A/B) between the total length (A) and the outer diameter (B) decreases. In particular, the end face cracks are easily generated in the end face on an outlet side of an exhaust gas. In this way, in the case of easily generating the cracks in the end face of the honeycomb basal body 4, the ring-shaped convex portion 10 is preferably disposed in the end portion of the honeycomb basal body 4 having the end face where the cracks are easily generated.

The number of the ring-shaped convex portions 10 is not limited to one, and a plural number of ring-shaped convex portions may be disposed. When the plural numbers of ring-shaped convex portions are disposed, the ring-shaped convex portions are preferably disposed in at least an exhaust gas outlet side end portion and a central portion.

As shown in FIG. 2, the ring-shaped convex portion 10 preferably has the porous partition walls 1 defining the plurality of cells 2 parallel to the extending direction of the cells 2. When the ring-shaped convex portion 10 is provided with the cells 2, it is possible to reduce the honeycomb structure 100 weight while preventing the generation of the ring cracks. The ring-shaped convex portion 10 is preferably formed integrally with the honeycomb basal body 4. In consequence, the ring-shaped convex portion 10 is firmly bonded to the honeycomb basal body 4. Here, "the ring-shaped convex portion 10 is formed integrally with the honeycomb basal body 4" means the following things. That is, it means a state that a boundary is not present between the partition wall constituting the ring-shaped convex portion 10 and the partition wall constituting the honeycomb basal body 4, and that the partition wall of the ring-shaped convex portion 10 is bonded to the partition wall of the honeycomb basal body 4 so that each of material of the partition walls is continuous. Such a honeycomb structure in which "the ring-shaped convex portion 10 is formed integrally with the honeycomb basal body 4" can be obtained by forming one honeycomb formed body "including a portion to be the ring-shaped convex portion and a portion to be the honeycomb basal body", followed by drying, firing, subjecting to processing and the like. It is not necessary to load a noble metal to be a catalyst onto the partition walls 1 defining "the cells 2 formed in the ring-shaped convex portion 10". This is because the exhaust gas hardly flows into "the cells 2 formed in the ring-shaped convex portion 10". As a method of loading the catalyst onto the honeycomb structure 100, it is preferably a method of immersing one end of the honeycomb structure 100 into slurry for the catalyst, and sucking the slurry for the catalyst through the other end. According to this method, it is possible to easily prepare the honeycomb structure not loading the catalyst onto "the cells 2 formed in the ring-shaped convex portion 10".

The honeycomb structure 100 preferably includes an outer peripheral coating layer 7 made of an outer peripheral coating material on "the outer peripheral surface" of the honeycomb basal body 4 "including the surface of the ring-shaped convex portion 10". By including the outer peripheral coating layer 7, it is possible to prevent leakage of the slurry for the catalyst at the time of sucking the slurry for the catalyst up. Furthermore, as shown in FIG. 1 and FIG. 2, the outer peripheral coating layer 7 is preferably formed so as to close open frontal areas of "the cells 2 formed in the ring-shaped convex portion 10". When the outer peripheral coating layer 7 is formed so as to close the open frontal areas of "the cells 2 formed in the ring-shaped convex portion 10", it is possible to prevent the exhaust gas flowing into "the cells 2 formed in the ring-shaped convex portion 10" from being discharged from the open frontal areas of "the cells 2 formed in the ring-shaped convex portion 10". That is, it is possible to prevent the leakage of the exhaust gas from the honeycomb structure 100. As described above, there is a case that the catalyst is not loaded onto the partition walls 1 defining "the cells 2 formed in the ring-shaped convex portion 10". In this case, when the outer peripheral coating layer 7 is not formed as described above, the exhaust gas being not sufficiently purified is discharged. That is, a purifying performance might deteriorate due to the leakage of the exhaust gas from the open frontal areas of "the cells 2 formed in the ring-shaped convex portion 10". Therefore, it is possible to suppress the deterioration of the purifying performance by forming the outer peripheral coating layer 7 so as to close the open frontal areas of "the cells 2 formed in the ring-shaped convex portion 10". An example of the outer peripheral coating material is the one obtained by adding additives such as an organic binder, resin balloon and dispersant to inorganic raw materials such as inorganic fiber, colloidal silica, clay and SiC particles, further adding water thereto and kneading the materials.

A thickness of the outer peripheral coating layer 7 is preferably from 1 to 1000 μm, and especially preferably from 10 to 500 μm. When the thickness of the outer peripheral coating layer 7 is within the above ranges, the generation of cracks can be prevented at the outer peripheral coating layer 7 during drying shrinkage since it is possible to uniformly dry the applied outer peripheral coating layer. When the thickness of the outer peripheral coating layer 7 is smaller than 1 μm, the slurry for the catalyst might leak from the honeycomb basal body 4 at the time of loading the catalyst. When the thickness of the outer peripheral coating layer 7 is in excess of 1000 μm, the purifying performance might deteriorate since a ratio of a cross section of a portion which does not have an exhaust gas purifying function increases.

In the honeycomb structure 100 of the present embodiment, a material of the honeycomb basal body 4 preferably contains, as a main component, at least one selected from the group consisting of cordierite, silicon carbide, mullite, aluminum titanate and alumina. Moreover, the material of the honeycomb basal body is further preferably made of at least one selected from the group consisting of cordierite, silicon carbide, mullite, aluminum titanate and alumina. Here, "the main component" means a component in excess of 50 mass % in the whole material.

In the honeycomb structure 100 of the present embodiment, an average pore diameter of the partition walls 1 is preferably from 5 to 100 μm, and especially preferably from 8 to 50 μm. When the average pore diameter is smaller than 5 μm, pressure loss may increase. When the average pore diameter is larger than 100 μm, strength of the honeycomb structure may be low. The average pore diameter is a value measured by a mercury porosimeter.

In the honeycomb structure 100 of the present embodiment, a porosity of the partition wall 1 is preferably from 30 to 80%, and especially preferably from 35 to 75%. When the porosity is smaller than 30%, pressure loss may increase. When the porosity is larger than 80%, strength of the honeycomb structure may be low. The porosity is a value measured by the mercury porosimeter.

A thickness of the partition wall 1 is preferably from 40 to 600 μm, and especially preferably from 150 to 400 μm. When it is smaller than 40 μm, strength of the honeycomb structure may be low. When it is larger than 600 μm, pressure loss may increase.

In the honeycomb structure 100 of the present embodiment, there is not any restriction on a shape of the honeycomb basal body 4. The shape of the honeycomb basal body 4 is preferably a cylindrical shape, a tubular shape with oval end faces, a tubular shape with end faces having a polygonal shape such as "a square shape, a rectangular shape, a triangular shape, a pentangular shape, a hexagonal shape or an octagonal shape" or the like. In the honeycomb structure 100 shown in FIG. 1, the shape of the honeycomb basal body 4 is cylindrical.

In the honeycomb structure 100 of the present embodiment, there is not any restriction on a cell shape of the honeycomb basal body 4 (the cell shape in the cross section perpendicular to the extending direction of the cells). Examples of the cell shape include a triangular shape, a quadrangular shape, a hexagonal shape, an octagonal shape, a round shape, and combinations of these shapes. The quadrangular shape is preferably a square shape or a rectangular shape.

In the honeycomb structure 100 of the present embodiment, there is not any restriction on a cell density of the honeycomb basal body 4. The cell density of the honeycomb basal body 4 is preferably from 15 to 200 cells/cm$^2$, and especially preferably from 30 to 100 cells/cm$^2$. When the cell density is smaller than 15 cells/cm$^2$, pressure loss may increase in a short time or strength of the honeycomb structure 100 may be low at the time of flowing the exhaust gas. When the cell density is larger than 200 cells/cm$^2$, pressure loss may increase.

The honeycomb structure of the present invention may arrange plugged portions in open frontal areas of predetermined cells (first cells) at one end face and in open frontal areas of the remaining cells (second cells) at another end face. The above first and second cells are preferably alternately arranged. And thereby, at both the end faces of the honeycomb structure, checkered patterns are preferably formed by the plugged portions and "the open frontal areas of the cells". A material of the plugged portions is preferably the same as the material being regarded as preferable for the honeycomb basal body (the partition walls). The material of the plugged portions and the material of the honeycomb basal body may be the same or different.

Figure 3:
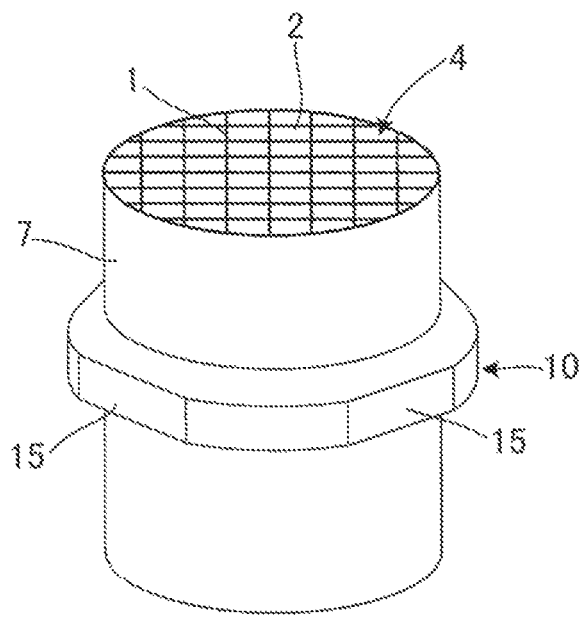
FIG. 3 is a perspective view schematically showing the other embodiment of the honeycomb structure of the present invention.

The other embodiment of the honeycomb structure of the present invention, as in a honeycomb structure 101 shown in FIG. 3, is the one that, in the one embodiment of the honeycomb structure of the present invention, a part of the surface of the ring-shaped convex portion 10 has a planar shape parallel to the extending direction of the cells 2. That is, a ring-shaped convex portion 10 is provided with planar portions 15 having a planar shape parallel to an extending direction of cells 2. A partial thickness H of the ring-shaped convex portion 10 becomes thinner (a thickness corresponding to the part of the planar portion 15 is thin) by including the ring-shaped convex portion 10 of which a part of the surface has the planar shape. Therefore, as a package container for use at conveyance of the honeycomb structure, a smaller one can be used. FIG. 3 is a perspective view schematically showing the other embodiment of the honeycomb structure of the present invention.

In the honeycomb structure 101 of the present embodiment, the ring-shaped convex portion preferably has a uniform shape in a peripheral direction, except for portions being provided with the planar portions 15. "The uniform shape in the peripheral direction" means that any shape of a cross section perpendicular to the peripheral direction has the same shape. It is to be noted that the honeycomb structure 101 of the present embodiment may be not the uniform shape in the peripheral direction at the portions of the ring-shaped convex portion, except for the portions being provided with the planar portions 15. Moreover, in the one embodiment of the honeycomb structure of the present invention (the honeycomb structure 100 including the ring-shaped convex portion not being provided with any planar portions), the ring-shaped convex portion preferably has the uniform shape in the peripheral direction over the whole periphery. It is to be noted that in the one embodiment of the honeycomb structure of the present invention (the honeycomb structure 100), the ring-shaped convex portion does not have to have the uniform shape in the peripheral direction over the whole periphery.

Figure 5:
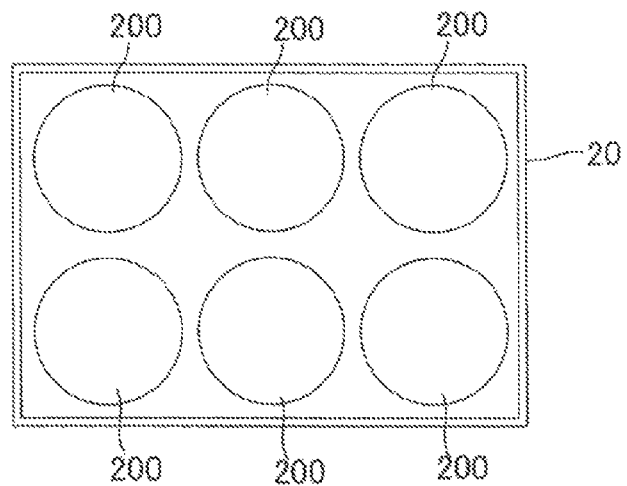
FIG. 5 is a plan view schematically showing a state that a plural number of conventional honeycomb structures are contained in an existing package container.
Figure 6:
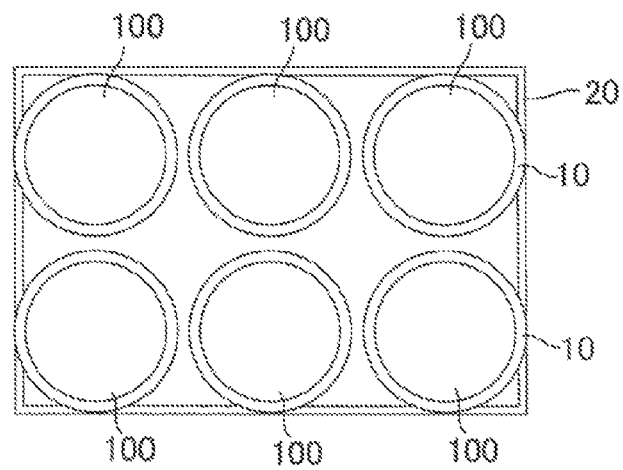
FIG. 6 is a plan view schematically showing a state that a plural number of honeycomb structures according to one embodiment of the present invention are contained in the existing package container.

Specifically, heretofore, a plural number of honeycomb structures 200 have been conveyed while being contained in such a rectangular parallelepiped package container 20 as shown in FIG. 5, at the conveyance of the honeycomb structures, or the like. The honeycomb structures are arranged so that the honeycomb structures are contained as many as possible in the package container. That is, the package container is usually designed so that "the shortest distance between the package container and the outer periphery of each honeycomb structure and a distance between the honeycomb structures" are shortened as much as possible for improving transfer efficiency. On the other hand, it is necessary to avoid a situation where "the package container comes in contact with the honeycomb structures during conveyance, to get broken the honeycomb structures". Therefore, the package container is usually designed so that "the shortest distance between the package container and the outer periphery of each honeycomb structure is from 1 to 50 mm and the distance between the honeycomb structures is from 1 to 50 mm". The package container satisfying such conditions will be called "the existing package container". The package container is designed as described above, and hence "the honeycomb structure provided with the ring-shaped convex portion 10" as in the honeycomb structure 100 shown in FIG. 1 might not be contained in the existing package container as shown in FIG. 6. It is to be noted that the honeycomb structure 100 shown in FIG. 1 is the one that the ring-shaped convex portion 10 is not provided with any planar portions.

Figure 7:
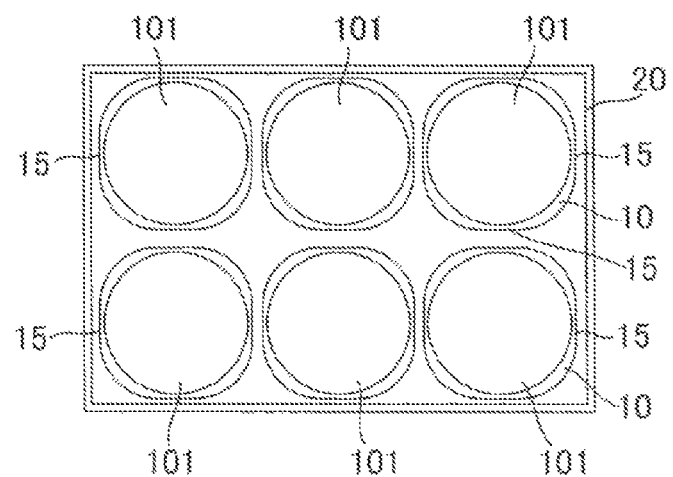
FIG. 7 is a plan view schematically showing a state that a plural number of honeycomb structures according to the other embodiment of the present invention are contained in the existing package container.

On the other hand, the honeycomb structure, in which "a part of the surface of the ring-shaped convex portion 10 has a planar shape parallel to the extending direction of the cells 2" as the honeycomb structure 101 shown in FIG. 3, is the one that a thickness of the ring-shaped convex portion 10 is thin at the planar portion. Therefore, as shown in FIG. 7, the honeycomb structures 101 can be contained in the existing package container 20. Accordingly, the existing package container 20 can be used. FIG. 5 is a plan view schematically showing a state that a plural number of conventional honeycomb structures are contained in the existing package container. In FIG. 5, partition walls of the honeycomb structures 200 are omitted. FIG. 6 is a plan view schematically showing a state that a plural number of honeycomb structures according to the one embodiment of the present invention are contained in the existing package container. In FIG. 6, the partition walls of the honeycomb structures 100 are omitted. FIG. 7 is a plan view schematically showing a state that a plural number of honeycomb structures according to the other embodiment of the present invention are contained in the existing package container. In FIG. 7, partition walls of the honeycomb structures 101 are omitted.

Figure 4:
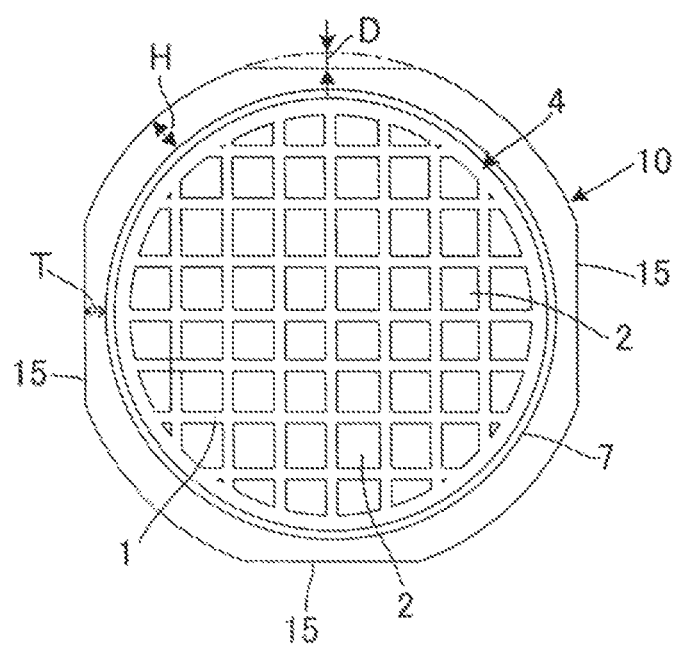
FIG. 4 is a plan view of the other embodiment of the honeycomb structure of the present invention seen from one end face side.

In the ring-shaped convex portion 10, a pair of planar portions 15 parallel to each other is preferably formed. Furthermore, in the ring-shaped convex portion 10, as shown in FIG. 4, two pairs of planar portions 15 parallel to each other are preferably formed so that one pair of planar portions 15 are perpendicular to another pair of planar portions 15. By forming the planar portions in this manner, it is possible to narrow a space for containing as compared with a case where any planar portions are not formed since the thin portions (the planar portions) are formed at the ring-shaped convex portion 10. Therefore, the honeycomb structure 101 can suitably be mounted even when a space for mounting is small as in the car or the like. FIG. 4 is a plan view of the other embodiment of the honeycomb structure of the present invention seen from one end face side.

A distance (the shortest distance) T (see FIG. 4) between the planar portion (the surface) and the outer periphery of the honeycomb basal body (a portion covered with the ring-shaped convex portion 10) is preferably from 1 to 15 mm, and especially preferably from 2.5 to 10 mm. When the distance T between the planar portion and the outer periphery of the honeycomb basal body is within the above ranges, the generation of the ring cracks can be prevented. Furthermore, even when the space for mounting is small as in the car or the like, the honeycomb structure can suitably be mounted. It can be said that the distance T between the planar portion (the surface) and the outer periphery of the honeycomb basal body is the thickness of the thinnest portion of the planar portion of the ring-shaped convex portion. It is to be noted that when the honeycomb structure includes the outer peripheral coating layer, the distance T is a value obtained by subtracting the thickness of the outer peripheral coating layer from the distance (the shortest distance) between the planar portion (the surface) and the outer periphery of the honeycomb basal body.

Figure 8:
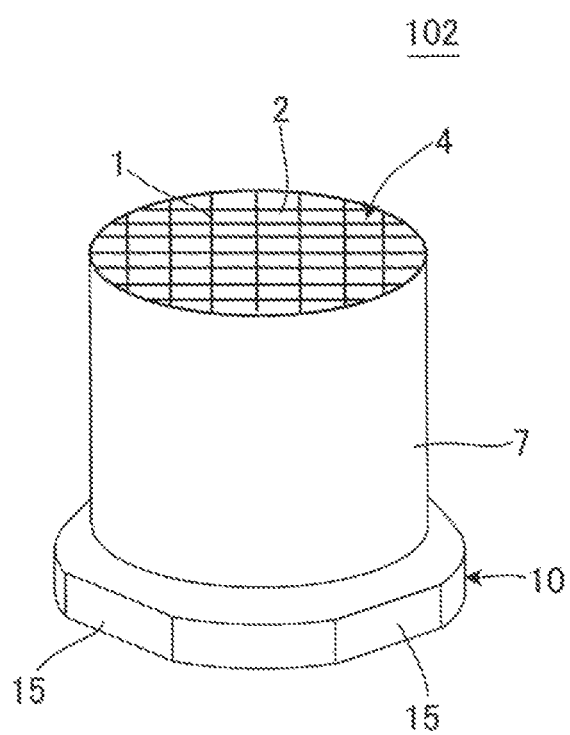
FIG. 8 is a perspective view schematically showing a still other embodiment of the honeycomb structure of the present invention.
Figure 9:
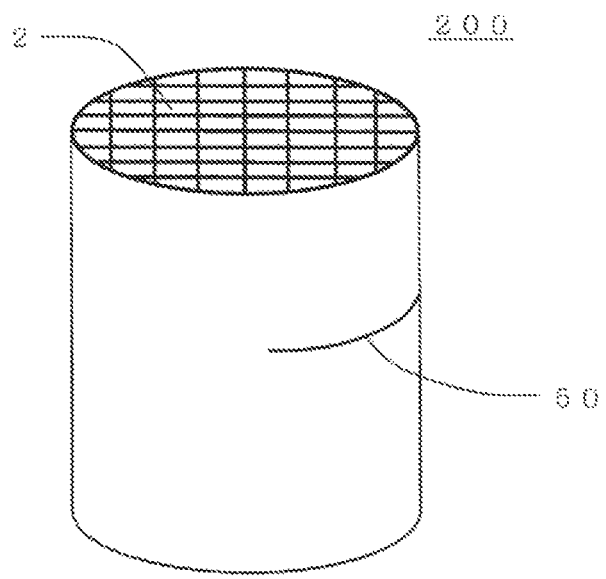
FIG. 9 is a perspective view schematically showing a state that a ring crack is generated in a conventional honeycomb structure.

The still other embodiment of the honeycomb structure of the present invention is the one that, in the other embodiment (the honeycomb structure 101) of the honeycomb structure of the present invention, the ring-shaped convex portion 10 is disposed in an end portion (one end portion) of the honeycomb basal body 4. A honeycomb structure 102 shown in FIG. 8 is still other embodiment of the honeycomb structure of the present invention. It is possible to prevent the generation of end face cracks by disposing a ring-shaped convex portion 10 in one end portion of the honeycomb structure 102 in this manner. In the case that the honeycomb structure is used as a DPF, the end face cracks may be generated in an exhaust gas outlet side end face. This end face cracks are generated as follows. Soot and the like included in an exhaust gas discharged from an engine of the car or the like are deposited in large amounts in the outlet side end portion of the honeycomb structure. Therefore, when the soot and the like are burnt to regenerate the honeycomb structure, the outlet side end portion of the honeycomb structure has a higher temperature than the other portions due to the burning of the soot and the like. Consequently, a stress occurs in the end portion of the honeycomb structure. As a result, the cracks (the end face cracks) are generated in the outlet side end face of the honeycomb structure. FIG. 8 is a perspective view schematically showing the still other embodiment of the honeycomb structure of the present invention.

(2) Manufacturing Method of Honeycomb Structure:

The honeycomb structure of the present invention can be manufactured by the following method. That is, the honeycomb structure of the present invention can be manufactured by a method having a honeycomb fired body preparing step of preparing a honeycomb fired body, and a cutting step of cutting an outer peripheral portion of this honeycomb fired body to form a ring-shaped convex portion. Furthermore, when the honeycomb structure includes an outer peripheral coating layer, the method preferably has an outer peripheral coating layer forming step, after cutting the outer peripheral portion of the honeycomb fired body. "The honeycomb fired body" is a honeycomb fired body having porous partition walls being formed by firing a ceramic raw material and defining a plurality of cells to become through channels of a fluid.

According to such a method, the honeycomb structure of the present invention can easily be prepared.

When "a part of the surface of the ring-shaped convex portion has a planar shape parallel to the extending direction of the cells" (the planar portion is formed in the ring-shaped convex portion), the honeycomb structure of the present invention can be manufactured by the following method. That is, the honeycomb structure including "the ring-shaped convex portion which is not provided with the planar portion" is firstly prepared. Afterward, a part of the ring-shaped convex portion of this honeycomb structure is cut so as to form the planar portion, so that the honeycomb structure including the ring-shaped convex portion provided with the planar portion can be manufactured as shown in FIG. 3. Moreover, in the case that "a part of the surface of the ring-shaped convex portion has the planar shape parallel to the extending direction of the cells", the honeycomb structure of the present invention can be manufactured by the following method. That is, the method has the above honeycomb fired body preparing step and the above cutting step, and in the above honeycomb fired body preparing step, a honeycomb fired body having polygonal column shape is prepared. Furthermore, in the cutting step, the honeycomb fired body is cut so that a part of the side surface of the honeycomb fired body is left, and this left part of the side surface forms the planar portion of the ring-shaped convex portion. In consequence, it is not necessary to perform an operation of forming the planar portion anew after the cutting step, to rationalize a manufacturing process.

Hereinafter, the manufacturing method of the honeycomb structure of the present invention will be described with respect to each step.

(2-1) Honeycomb Fired Body Preparing Step:

The honeycomb fired body preparing step is a step of preparing the honeycomb fired body including porous partition walls formed by firing the ceramic raw material. There is not any restriction on the method of preparing the honeycomb fired body. Hereinafter, the honeycomb fired body preparing step will be described in each stages.

(2-1-1) Forming Step:

Firstly, in the forming step, a ceramic forming raw material containing the ceramic raw material is preferably formed to obtain a honeycomb formed body including the partition walls (non-fired) defining the plurality of cells to become the through channels of the fluid. The honeycomb formed body is a formed body having a honeycomb structure.

The ceramic raw material contained in the ceramic forming raw material is preferably at least one selected from the group consisting of a cordierite forming raw material, cordierite, silicon carbide, a silicon-silicon carbide composite material, mullite, and aluminum titanate. It is to be noted that the cordierite forming raw material is a ceramic raw material blended so as to obtain a chemical composition falling in ranges of 42 to 56 mass % of silica, 30 to 45 mass % of alumina, and 12 to 16 mass % of magnesia. Moreover, the cordierite forming raw material is fired to become cordierite.

Moreover, the ceramic forming raw material is preferably prepared by mixing the above ceramic raw material with a dispersion medium, an organic binder, an inorganic binder, a pore former, a surfactant and the like. There is not any restriction on a composition ratio of each raw material, and the composition ratio is preferably determined in accordance with a structure, a material and the like of the honeycomb structure to be prepared.

In the formation of the ceramic forming raw material, it is preferable that the ceramic forming raw material is first kneaded to obtain a kneaded material and then the obtained kneaded material is formed into a honeycomb shape. There is not any restriction on a method of kneading the ceramic forming raw material to form the kneaded material, and examples of the method are methods using a kneader, a vacuum clay kneader or the like. There is not any restriction on a method of forming the kneaded material to obtain the honeycomb formed body, and heretofore known forming methods such as extrusion forming or injection forming can be used. A preferable example of the method is that the honeycomb formed body is formed by performing the extrusion forming with a use of a die having a desirable cell shape, partition wall thickness and cell density. A material of the die is preferably cemented carbide which does not easily wear out.

Examples of a shape of the honeycomb formed body include a columnar shape, an oval column shape, and a polygonal column shape with end faces having "a square shape, a rectangular shape, a triangular shape, a pentangular shape, a hexagonal shape or an octagonal shape". When the honeycomb structure including "the ring-shaped convex portion provided with the planar portion" is manufactured, the honeycomb formed body having polygonal column shape is preferably used. This is because it is possible to make the left part of the side surface as the planar portion of the ring-shaped convex portion by leaving a part of a side surface of a polygonal column. That is, an operation of forming the planar portion can be omitted. The honeycomb formed body further preferably has a quadrangular column shape.

Moreover, after the above formation, the obtained honeycomb formed body may be dried. There is not any restriction on a drying method. Examples of the drying method include hot air drying, microwave drying, dielectric drying, reduced pressure drying, vacuum drying, and freeze drying. Among these methods, the dielectric drying, the microwave drying, the hot air drying or combination thereof is preferably performed.

(2-1-2) Firing Step:

Next, the honeycomb formed body is fired to prepare a honeycomb fired body.

The honeycomb formed body is preferably subjected to calcinating prior to the firing (firing) of the honeycomb formed body. The calcination is performed for the purpose of degreasing. There is not any restriction on a method of calcinating the honeycomb formed body, as long as an organic substance (the organic binder, the surfactant, the pore former, etc.) can be removed. In general, a burning temperature of the organic binder is from about 100 to 300° C., and a burning temperature of the pore former is from about 200 to 800° C. Therefore, as calcinating conditions, it is preferable that heating is performed at about 200 to 1000° C. under an oxidation atmosphere for about 3 to 100 hours.

The firing (firing) of the honeycomb formed body is performed for the purpose of sintering and densifying the forming raw material constituting the calcinated honeycomb formed body to acquire a predetermined strength. Firing conditions (temperature, time, atmosphere, etc.) vary in accordance with the type of the forming raw material, and hence suitable conditions may be selected in accordance with the type. For example, when the cordierite forming raw material is used, the firing temperature is preferably from 1410 to 1440° C. Moreover, the firing time, as time to keep the highest temperature, is preferably from 4 to 8 hours. There is not any restriction on a device performing the calcinating and firing, but an electric furnace, a gas furnace or the like can be used.

(2-2) Cutting Step:

The cutting step is a step of cutting an outer peripheral portion of the honeycomb fired body. There is not any restriction on a method of cutting the honeycomb fired body. As the method of cutting the outer peripheral portion of the honeycomb fired body, a heretofore known method can suitably be employed, but the method is preferably a method of pushing a grindstone coated with diamond onto the honeycomb fired body while rotating the honeycomb fired body. In the cutting step, a thickness of "the outer peripheral portion of the honeycomb fired body being subjected to cutting" becomes the same thickness of the ring-shaped convex portion formed after the cutting.

As described above, when the honeycomb structure including the ring-shaped convex portion provided with "the planar portion parallel to the extending direction of the cells" is prepared, the honeycomb fired body is preferably cut as follows. That is, the honeycomb fired body is preferably cut so that a part of the side surface of the honeycomb fired body having polygonal column shape is left, and the left part of the side surface becomes the planar portion of the ring-shaped convex portion. In consequence, it is not necessary to perform an operation of forming the planar portion anew after the cutting.

It is to be noted that the cutting may be performed before or after the firing of the honeycomb formed body, but the cutting is preferably performed after the firing. When the cutting is performed after the firing, it is possible to set the shape of the honeycomb fired body by the cutting, even if the honeycomb fired body is deformed by the firing.

(2-3) Plugging Step:

When the honeycomb structure including plugged portions is prepared, the following plugging step is preferably performed after the cutting step. In this plugging step, the plugged portions are arranged in open frontal areas of "the predetermined cells" in one end face and open frontal areas of "the remaining cells" in another end face of the honeycomb fired body. Hereinafter, the step will specifically be described.

Firstly, the cell open frontal areas of the one end face of the honeycomb fired body (the honeycomb basal body) are filled with a plugging material. As a method of filling the cell open frontal areas of the one end face with the plugging material, it is preferably a method having a masking step and a press-in step. The masking step is a step of attaching a sheet to the one end face of the honeycomb fired body and then making holes at positions which overlap with "the cells to be provided with the plugged portions" in the sheet. The press-in step is a step of pressing "the end of the honeycomb fired body to which the sheet has been attached" into a container containing the plugging material, to press the plugging material into the cells of the honeycomb fired body. When the plugging material is pressed into the cells of the honeycomb fired body, the plugging material passes through the holes made in the sheet to be filled into the only cells communicating with the holes made in the sheet.

The plugging material can be prepared by suitably mixing raw materials set forth in examples of constituent elements of the above ceramic forming raw material. As a ceramic raw material contained in the plugging material, it is preferably the same as the ceramic raw material for use as the raw material of the partition walls.

Next, it is preferable that the plugging material being filled into the honeycomb fired body is dried.

In the one end face of the honeycomb fired body, it is preferable that the cells provided with the plugged portions and the cells which are not provided with the plugged portions are alternately arranged. In this case, in the one end face provided with the plugged portions, the plugged portions and "the open frontal areas of the cells" form a checkered pattern.

Next, the plugged portions are preferably arranged in the open frontal areas of "the remaining cells" in another end face of the honeycomb fired body in the same manner as in the one end face. It is to be noted that the drying of the plugging material may be performed after filling both the end faces of the honeycomb fired body with the plugging material. Moreover, the firing step may be performed after filling the honeycomb formed body with the plugging material.

(2-4) Outer Peripheral Coating Layer Forming Step:

The cut outer periphery of the honeycomb fired body is preferably coated with an outer peripheral coating material to form the outer peripheral coating layer. By forming the outer peripheral coating layer, it is possible to prevent the chip of the ring-shaped convex portion. As the outer peripheral coating material, there is one being obtained by adding additives such as an organic binder, resin balloon and dispersant to inorganic raw materials such as inorganic fiber, colloidal silica, clay and SiC particles, further adding water thereto and kneading the materials. An example of a coating method with the outer peripheral coating material is a method of coating the "cut" outer periphery of "the honeycomb fired body" with a use of rubber spatula or the like while rotating the body on a potter's wheel.

EXAMPLES

Hereinafter, the present invention will further specifically be described based on examples. The present invention is not limited to these examples.

Example 1

As a ceramic raw material, a mixture of silicon carbide (SiC) powder and metal silicon (Si) powder was used. Then, hydroxypropyl methylcellulose as a binder, and a pore former were added thereto, and furthermore, water was added to prepare a forming raw material. Then, the forming raw material was kneaded by a vacuum clay kneader, to prepare a kneaded material. A content of the binder was 7 parts by mass, when a total of the silicon carbide (SiC) powder and the metal silicon (Si) powder was 100 parts by mass. A content of the pore former was 3 parts by mass, when the total of the silicon carbide (SiC) powder and the metal silicon (Si) powder was 100 parts by mass. A content of the water was 42 parts by mass, when the total of the silicon carbide (SiC) powder and the metal silicon (Si) powder was 100 parts by mass. An average particle diameter of the silicon carbide powder was 20 µm, and an average particle diameter of the metal silicon powder was 6 µm. Moreover, an average particle diameter of the pore former was 20 µm. The average particle diameters of silicon carbide, metal silicon and the pore former were values measured by a laser diffraction method.

The obtained kneaded material was formed by using an extrusion forming machine, to obtain a columnar honeycomb formed body. The obtained honeycomb formed body was dried by high frequency dielectric heating, and then dried at 120° C. for 2 hours by use of a hot air drier.

The dried honeycomb formed body was degreased and fired, to obtain a columnar honeycomb fired body. Degreasing conditions were 550° C. and 3 hours. Firing conditions were 1450° C. and 2 hours under an argon atmosphere.

Next, an outer peripheral portion of the obtained columnar honeycomb fired body was cut so that "a ring-shaped convex portion was left in a central portion in an extending direction of the cells". Afterward, the cut outer periphery of the honeycomb fired body was coated with an outer peripheral coating material to form an outer peripheral coating layer. A honeycomb structure shown in FIG. 1 was obtained in this manner. A method of cutting the outer peripheral portion of the honeycomb fired body was a method of pushing a grindstone covered with diamond onto the outer peripheral portion of the honeycomb fired body at an angle of 45° to the extending direction of the cells while rotating the honeycomb fired body. In consequence, there was obtained the honeycomb structure including a ring-shaped convex portion having tapered shape at both end portions (both the end portions in the extending direction of the cells). The taper angles of the ring-shaped convex portion in this honeycomb structure were 45° at both end portions. Incidentally, this honeycomb structure was not provided with any planar portions.

A bottom face of the obtained honeycomb structure had a round shape having a diameter of 14.4 cm, and a length of the honeycomb structure in the extending direction of the cells was 20.3 cm. Moreover, a partition wall thickness was 305 µm, and a cell density was 46.5 cells/cm². A thickness (H) of the ring-shaped convex portion (the convex portion thickness) was 10 mm, and a width (L) of the ring-shaped convex portion (the convex portion width) was 2.0 cm. The ring-shaped convex portion was disposed at a position where a distance from one end of the honeycomb structure to an end portion of the ring-shaped convex portion being closer to the one end of the honeycomb structure was 6.4 cm. The thickness (H) of the ring-shaped convex portion was a thickness H of the ring-shaped convex portion in a cross section perpendicular to the extending direction of the cells. The width (L) of the ring-shaped convex portion was a length of the ring-shaped convex portion in the extending direction of the cells of the honeycomb structure. "A planar portion depth (D)" was a difference between the thickness (H) of the ring-shaped convex portion and "a distance" T "between the planar portion (the surface) and an outer periphery of a honeycomb basal body" (see FIG. 4).

The obtained honeycomb structure was subjected to evaluation of each of "ring crack", "convex portion strength", "mounting properties" and "package properties" by the following methods. The results are shown in Table 1.

In Tables 1 and 2, a column of "a convex portion attaching position" indicates a position where the ring-shaped convex portion is disposed. "The center" indicates that the ring-shaped convex portion is disposed in a central portion of the honeycomb structure in an extending direction of the cells. "An end portion" indicates that the ring-shaped convex portion is disposed in an end portion of the honeycomb structure in the extending direction of the cells. "A convex portion angle (°)" indicates taper angles of the ring-shaped convex portion at both end portions.

(Ring Crack)

Firstly, the honeycomb structure was attached to a burner tester. Next, the following operation was performed by this burner tester. That is, the operation of "allowing a high temperature gas at 800° C. to flow through the honeycomb structure for 10 minutes and then allowing a cooling gas at 150° C. to flow through the honeycomb structure for 10 minutes" was regarded as one cycle of the temperature raising and cooling operation. The temperature raising and cooling operations for 100 cycles were performed. Afterward, the presence or absence of a ring crack generated in the honeycomb structure was visually confirmed, and evaluated in terms of the following standards. A case where a ring crack at a degree of deteriorating a function of a DPF was generated in the honeycomb structure was "C". A case where a ring crack was generated in the honeycomb structure but it was a degree that the function of the DPF was not deteriorated was "B". A case where any ring cracks were not present in the honeycomb structure was "A". "A" and "B" passed, and "C" failed. It is to be noted that, as to "the function of the DPF", when the number of particulates of PM in a gas subjected to a treatment (an exhaust gas treatment by the DPF) was $6.0 \times 10^{-11}$ particulates/km or less being a regulated PM particulate value (European Regulation "EURO6"), it was evaluated as a degree that the function of the DPF was not deteriorated. Moreover, when the number of the particulates of the PM in the gas subjected to a treatment was in excess of $6.0 \times 10^{-11}$ particulates/km being the regulated PM particulate value, it was evaluated as a degree that the function of the DPF was deteriorated.

(Convex Portion Strength)

First, a pendulum having a string (a length of 75 cm) including an iron ball with a diameter of 11 mm (a weight of 5.4 g) at a tip thereof was prepared. Next, this pendulum was disposed so that the iron ball hits the end portion (an outermost peripheral portion) of the ring-shaped convex portion of the honeycomb structure at the lowest point of the iron ball (i.e., in a state where the pendulum was not swung). Next, the iron ball of the pendulum was swung upwards to hit the end portion of the ring-shaped convex portion. Afterward, the end portion of the ring-shaped convex portion was visually observed. Then, the evaluation was carried out in terms of the following standards. When the iron ball was swung up to a height of 80% of a length of the above string to hit the end portion of the ring-shaped convex portion, a defect such as chip was generated in the end portion of the ring-shaped convex portion, which was "C". When the iron ball was swung up to a height of 100% of the length of the above string to hit the end portion of the ring-shaped convex portion, a defect such as chip was generated in the end portion of the ring-shaped convex portion, which was "B". At this time, any defects were not generated, which was "A". The "A" evaluation and the "B" evaluation passed, and the "C" evaluation failed.

(Mounting Properties)

Mounting properties of honeycomb structures each having a ring-shaped convex portion which was not provided with a planar portion (Examples 1 to 14 and Comparative Examples 1 to 4) and a honeycomb structure which was not provided with a ring-shaped convex portion (Comparative Example 11) were evaluated in accordance with the thickness (H) and width (L) of the ring-shaped convex portion. The evaluation of the thickness (H) of the ring-shaped convex portion may be called as "the evaluation of "a diameter direction"". Moreover, the evaluation of the width (L) of the ring-shaped convex portion may be called as "the evaluation of "a total length direction"". The evaluation of the thickness (H) of the ring-shaped convex portion was as follows. A case where the thickness of the ring-shaped convex portion was 10 mm or less was "A", a case where it was from in excess of 10 mm to 15 mm or less was "B", and a case where it was in excess of 15 mm was "C". The evaluation of the width (L) of the ring-shaped convex portion was as follows. A case where the width of the ring-shaped convex portion was in excess of 80% of the length of the honeycomb structure in the extending direction of the cells was "B", and a case where the width was 80% or less of the length of the honeycomb structure in the extending direction of the cells was "A". In the case of "B", the mounting properties of the honeycomb structure were affected. In the case of "A", the mounting properties of the honeycomb structure were not affected.

Furthermore, the mounting properties were subjected to comprehensive evaluation in consideration of both the thickness (H) and the width (L) of the ring-shaped convex portion. When both "the evaluation of the diameter direction" and "the evaluation of the total length direction" were "A", the comprehensive evaluation was "A". When at least one of "the evaluation of the diameter direction" and "the evaluation of the total length direction" was "B", the comprehensive evaluation was "B". When "the evaluation of the diameter direction" was "C", the comprehensive evaluation was "C". As to the comprehensive evaluation of the mounting properties, the "A" evaluation was most preferable, and the "B" evaluation was next preferable. Moreover, the "C" evaluation was the worst evaluation among these A, B and C evaluations. It is to be noted that the honeycomb structure of Comparative Example 11 was regarded as a honeycomb structure in which the thickness of the ring-shaped convex portion was "0 mm". The results are shown in Table 1.

The honeycomb structure having the ring-shaped convex portion provided with the planar portion was evaluated as follows (an effect of the planar portion). First, it assumed an external cylinder in which a shape in a cross section perpendicular to a central axis of the honeycomb structure provided with the planar portion (hereinafter, it may be referred to as "a honeycomb structure X") was analogous to a shape of the above honeycomb structure X and a space between the honeycomb structure X and the external cylinder was uniformly 5 mm. Next, in the cross section being perpendicular to a central axis of this external cylinder, a line segment a passing through the center of the external cylinder and connecting two points of the outer peripheral portion of the external cylinder, a line segment b perpendicular to the line segment a, and a line segment c tilting at 45° to the line segment a were drawn. Each of the line segments b and c was a line segment passing through the center of the external cylinder and connecting two points of the outer peripheral portion of the external cylinder. The line segments a and b were perpendicular to a plane formed in the external cylinder. Next, a total of the line segments a, b and c was calculated. Next, it assumed a honeycomb structure (hereinafter, it may be referred to as "a honeycomb structure Y") which was not provided with the ring-shaped convex portion in the above honeycomb structure X. Next, similarly to the above honeycomb structure X, it assumed an external cylinder in which a shape was analogous to a shape of the honeycomb structure Y and a space between the above honeycomb structure Y and the external cylinder was uniformly 5 mm. Next, similarly to the above honeycomb structure X, line segments a, b and c were drawn. Next, a total of the line segments a, b and c was calculated. Afterward, the evaluation was carried out in terms of the following standards. A case where a ratio of "the total of the line segments a, b and c" calculated in the honeycomb structure X with respect to "the total of the line segments a, b and c" calculated in the honeycomb structure Y was 104% or less was "A". A case where the ratio of "the total of the line segments a, b and c" calculated in the honeycomb structure X with respect to "the total of the line segments a, b and c" calculated in the honeycomb structure Y was 106% or less was "B". A case where the ratio of "the total of the line segments a, b and c" calculated in the honeycomb structure X with respect to "the total of the line segments a, b and c" calculated in the honeycomb structure Y was larger than 106% was "C". It is to be noted that the above evaluation as to the honeycomb structure having the ring-shaped convex portion provided with the planar portion corresponded to "the evaluation of the diameter direction". Moreover, the honeycomb structure having the ring-shaped convex portion provided with the planar portion was also subjected to "the evaluation of the total length direction" and "the comprehensive evaluation" in the same manner as in the honeycomb structure having the ring-shaped convex portion which was not provided with the above planar portion. The results are shown in Table 2.

(Package Properties)

The evaluation of a depth of the planar portion of the ring-shaped convex portion of the honeycomb structure was carried out as follows. A package container to package "the honeycomb structures each having the same size as a ceramic basal body" was regarded as "the existing package container". As shown in FIG. 5, six honeycomb structures were contained in "the existing package container". Moreover, "the existing package container" was disposed in a pallet having an area being 410% larger than an area of a bottom face of "the existing package container". A case where it was possible to contain six honeycomb structures in this "existing package container" was "A" evaluation. Moreover, though a package container larger than "the existing package container" was required to contain the six honeycomb structures, a case where it was possible to dispose the larger package container in the pallet was "B" evaluation. Furthermore, a case where it was necessary to contain the honeycomb structures in a package container larger than "the existing package container" was "C" evaluation.

TABLE 1

| | Convex portion attaching position | Convex portion angle (°) | Convex portion thickness (H) (mm) | Convex portion width (L) (mm) | Ring crack | portion section strength | Mounting properties Diameter direction | Total length direction | Comprehensive | Package properties |
|---|---|---|---|---|---|---|---|---|---|---|
| Comparative Example 11 | — | — | 0 | 0 | C | — | A | A | A | A |
| Example 1 | Center | 45 | 10 | 20 | A | B | A | A | A | B |
| Comparative Example 1 | Center | 45 | 1 | 20 | C | A | A | A | A | A |
| Example 2 | Center | 45 | 3 | 20 | B | A | A | A | A | A |
| Example 3 | Center | 45 | 5 | 20 | A | A | A | A | A | A |
| Example 4 | Center | 45 | 15 | 30 | A | B | B | A | B | C |
| Example 5 | Center | 45 | 20 | 40 | A | B | C | A | C | C |
| Example 12 | Center | 45 | 10 | 50 | A | A | A | A | A | B |
| Example 13 | Center | 45 | 10 | 100 | A | A | A | A | A | B |
| Example 14 | Center | 45 | 10 | 160 | A | A | A | B | B | B |
| Example 6 | Center | 22 | 10 | 50 | A | B | A | A | A | B |
| Example 7 | Center | 35 | 10 | 50 | A | A | A | A | A | B |
| Example 8 | Center | 60 | 10 | 50 | A | A | A | A | A | B |
| Comparative Example 2 | Center | 75 | 10 | 50 | A | A | A | A | A | B |
| Comparative Example 3 | Center | 90 | 10 | 50 | A | C | A | A | A | B |
| Comparative Example 4 | End portion | 45 | 1 | 20 | C | A | A | A | A | A |
| Example 9 | End portion | 45 | 3 | 20 | B | A | A | A | A | A |
| Example 10 | End portion | 45 | 5 | 20 | A | A | A | A | A | A |
| Example 11 | End portion | 45 | 10 | 20 | A | B | A | A | A | B |

Examples 2 to 14 and Comparative Examples 1 to 4

The honeycomb structures were obtained in the same manner as in Example 1, except that conditions were changed as shown in Table 1. The obtained honeycomb structures were subjected to evaluation of each of "ring crack", "convex portion strength", "mounting properties" and "package properties" by the above methods. The results are shown in Table 1.

Example 15

A kneaded material was obtained in the same manner as in Example 1. The obtained kneaded material was formed by using an extrusion forming machine, to obtain a honeycomb formed body having quadrangular column shape. The obtained honeycomb formed body was dried by high frequency dielectric heating, and then dried at 120° C. for 2 hours by use of a hot air drier.

The dried honeycomb formed body was degreased and fired to obtain a honeycomb fired body having quadrangular column shape. Degreasing conditions were 550° C. for 3 hours. Firing conditions were 1450° C. for 2 hours under an argon atmosphere.

An outer peripheral portion of the obtained honeycomb fired body having quadrangular column shape was cut so that "a ring-shaped convex portion was formed, and a part of each side surface of the honeycomb fired body was left as a planar portion formed on the ring-shaped convex portion". The ring-shaped convex portion was formed "in a central portion" of the honeycomb fired body "in an extending direction of the cells". Afterward, the cut outer periphery of the honeycomb fired body was coated with an outer peripheral coating material to form an outer peripheral coating layer. A honeycomb structure shown in FIG. 3 was obtained in this manner. A method of cutting the outer peripheral portion of the honeycomb fired body was a method of pushing a grindstone covered with diamond onto the outer peripheral portion of the honeycomb fired body at an angle of 45° to the extending direction of the cells while rotating the honeycomb fired body. In this way, there was obtained a honeycomb structure having a ring-shaped convex portion "provided with four planar portions and having tapered shapes at both end portions". The taper angles of the ring-shaped convex portion in this honeycomb structure were 45° at both end portions. The ring-shaped convex portion of the honeycomb structure of the present example was provided with two pairs of planar portions (four planar portions in total) parallel to each other as shown in FIG. 4.

A bottom face of the obtained honeycomb structure had a round shape having a diameter of 14.4 cm, and a length of the honeycomb structure in the extending direction of the cells was 20.3 cm. Moreover, a partition wall thickness was 305 μm, and a cell density was 46.5 cells/cm². A thickness (H) of the ring-shaped convex portion was 20 mm, and a width (L) of the ring-shaped convex portion was 5.0 cm. A planar portion depth (D) (four portions) was 10 mm. The ring-shaped convex portion was disposed at a position where "a distance from one end of the honeycomb structure to an end portion of the ring-shaped convex portion being closer to this one end of the honeycomb structure" was 6.4 cm.

The obtained honeycomb structure was subjected to evaluation of each of "ring crack", "convex portion strength", "mounting properties" and "package properties" by the above methods. The results are shown in Table 2.

TABLE 2

| | Convex portion attaching position | Convex portion angle (°) | Convex portion thickness (H) (mm) | Planar portion depth (D) (mm) | Convex portion width (L) (mm) | Ring crack | Convex portion strength | Mounting properties | | | Package properties |
|---|---|---|---|---|---|---|---|---|---|---|---|
| | | | | | | | | Diameter direction | Total length direction | Comprehensive | |
| Comparative Example 5 | Center | 45 | 20 | 20 | 50 | C | A | B | A | B | A |
| Example 15 | Center | 45 | 20 | 10 | 50 | A | A | C | A | C | B |
| Comparative Example 6 | Center | 45 | 15 | 15 | 50 | C | A | A | A | A | A |
| Example 16 | Center | 45 | 15 | 7.5 | 50 | A | A | C | A | C | B |
| Comparative Example 7 | Center | 45 | 10 | 10 | 50 | C | A | A | A | A | A |
| Example 17 | Center | 45 | 10 | 5 | 50 | A | A | B | A | B | A |
| Comparative Example 8 | Center | 45 | 6 | 6 | 50 | C | A | A | A | A | A |
| Example 18 | Center | 45 | 6 | 3 | 50 | B | A | A | A | A | A |
| Comparative Example 9 | Center | 45 | 3 | 3 | 50 | C | A | A | A | A | A |
| Comparative Example 10 | Center | 45 | 3 | 1.5 | 50 | C | A | A | A | A | A |

Examples 16 to 18

The honeycomb structures were obtained in the same manner as in Example 15, except that conditions were changed as shown in Table 2. The obtained honeycomb structures were subjected to evaluation of each of "ring crack", "convex portion strength", "mounting properties" and "package properties" by the above methods. The results are shown in Table 2.

Comparative Example 5

A columnar honeycomb fired body was obtained in the same manner as in Example 1. An outer peripheral portion of the obtained columnar honeycomb fired body was cut in the same manner as in Example 1, to obtain "the cut honeycomb fired body" similar to Example 1. A ring-shaped convex portion of the obtained "cut honeycomb fired body" was cut so as to form four planes parallel to an extending direction of the cells, to form planar portions. When the ring-shaped convex portion was cut to form the planar portions, "a distance between an outer peripheral surface of the honeycomb fired body and each planar portion (the surface)" was 0 mm. Afterward, an outer periphery of the honeycomb fired body was coated with an outer peripheral coating material to form an outer peripheral coating layer. In this way, there was obtained a honeycomb structure including "a convex portion disposed to project outwardly from an outer periphery of a honeycomb basal body and to cover a part of the outer periphery of the honeycomb basal body". "The four planes parallel to the extending direction of the cells" were formed as follows. Firstly, a part of the ring-shaped convex portion was cut by a cutter to form one plane, and then the only "cut honeycomb fired body" was rotated at 90°. Afterward, a part of the ring-shaped convex portion was further similarly cut by the cutter to form the next plane. This operation was repeated, to form the four planes parallel to the extending direction of the cells. The obtained honeycomb structure included "a simulated ring-shaped convex portion intermittently formed" which did not surround the outer periphery of the honeycomb basal body over the whole periphery but intermittently surrounded the outer periphery. Here, "the simulated ring shape" means that the shape looks like "the ring shape" but is not "the ring shape", and means that a part of the ring shape is interrupted and the shape is intermittently formed.

Comparative Examples 6 to 10

The honeycomb structures were obtained in the same manner as in Comparative Example 5, except that conditions were changed as shown in Table 2. The obtained honeycomb structures were subjected to evaluation of each of "ring crack", "convex portion strength", "mounting properties" and "package properties" by the above methods. The results are shown in Table 2.

Comparative Example 11

A columnar honeycomb fired body was obtained in the same manner as in Example 1. Afterward, an outer periphery of the honeycomb fired body was coated with an outer peripheral coating material to form an outer peripheral coating layer. In this way, a columnar honeycomb structure "which was not provided with a ring-shaped convex portion" was obtained. The obtained honeycomb structures were subjected to evaluation of each of "ring crack", "mounting properties" and "package properties" by the above methods. The results are shown in Table 1.

It is seen from Tables 1 and 2 that the honeycomb structures of Example 1 to 18 hardly generate ring cracks as compared with the honeycomb structures of Comparative Examples 1 to 11. It is also seen that the honeycomb structures of Examples 1 to 18 hardly generate a defect such as chip in "the ring-shaped convex portion" as compared with the honeycomb structure of Comparative Example 3, even when "ring-shaped convex portions" is subjected to an external force during conveyance or the like. The honeycomb structure of Comparative Example 1 was the one of which the shape of a ring-shaped convex portion was not tapered shape at both end portions.

In Comparative Examples 5 to 9, a convex portion thickness (H) was the same length as a planar portion depth (D). That is, simulated ring-shaped convex portions of the honeycomb structures according to Comparative Examples 5 to 9 were not formed over the outer peripheries of the honeycomb structures. In other words, there was a part with which the simulated ring-shaped convex portion was not provided over the outer periphery of the honeycomb structure. Therefore, the evaluation of the ring crack was "C". The honeycomb structure according to Comparative Example 11 was not provided with the ring-shaped convex portion, and hence the evaluation of the ring crack was "C".

A honeycomb structure of the present invention can suitably be utilized as a filter to purify gases discharged from an internal combustion engine such as a diesel engine and a direct injection gasoline engine, various burning devices and the like.

DESCRIPTION OF REFERENCE NUMERALS

1: partition wall, 2: cell, 4: honeycomb basal body, 7: outer peripheral coating layer, 10: ring-shaped convex portion, 11: tapered surface, 15: planar portion, 20: package container, 50: ring crack, and 100, 101, 102 and 200: honeycomb structure.

What is claimed is:

1. A honeycomb structure comprising:
   a honeycomb basal body having porous partition walls defining a plurality of cells having an extending direction that become through channels of a fluid; and
   a ring-shaped convex portion surrounding an outer periphery of the honeycomb basal body and covering only a part of the outer periphery in a direction parallel to the extending direction of the cells,
   wherein the ring-shaped convex portion is disposed to project outwardly from the outer periphery of the honeycomb basal body, and in the ring-shaped convex portion, outwardly adjacent plural cells are formed to extend in parallel to the extending direction of the cells, with each adjacent plural cell having a length, and the length of an outward plural cell being less than the length of an inward plural cell such that both end portions of the ring-shaped convex portion are tapered,
   a thickness of the ring-shaped convex portion in a cross section perpendicular to the extending direction of the cells is from 3 to 20 mm, and
   a part of a surface of the ring-shaped convex portion, when viewed in a plane perpendicular to the extending direction of the cells, has a planar shape parallel to the extending direction of the cells.

2. The honeycomb structure according to claim 1, wherein the thickness of the ring-shaped convex portion in the cross section perpendicular to the extending direction of the cells is from 5 to 10 mm.

3. The honeycomb structure according to claim 2, wherein a width of the ring-shaped convex portion is from 1 to 80% of a length in the extending direction of the cells.

4. The honeycomb structure according to claim 2, wherein the honeycomb basal body is made of at least one selected from the group consisting of cordierite, silicon carbide, mullite, aluminum titanate and alumina.

5. The honeycomb structure according to claim 1, wherein a width of the ring-shaped convex portion is from 1 to 80% of a length in the extending direction of the cells.

6. The honeycomb structure according to claim 5, wherein the honeycomb basal body is made of at least one selected from the group consisting of cordierite, silicon carbide, mullite, aluminum titanate and alumina.

7. The honeycomb structure according to claim 1, wherein the honeycomb basal body is made of at least one selected from the group consisting of cordierite, silicon carbide, mullite, aluminum titanate and alumina.

8. The honeycomb structure according to claim 1, wherein the ring-shaped convex portion has alternating rounded and planar outer surface convex portions that surround the honeycomb basal body circumference.

* * * * *